(12) United States Patent
Suzuki

(10) Patent No.: US 11,858,755 B2
(45) Date of Patent: Jan. 2, 2024

(54) GRIPPING APPARATUS AND STACKER

(71) Applicant: Murata Machinery, Ltd., Kyoto (JP)

(72) Inventor: Takahito Suzuki, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 17/796,711

(22) PCT Filed: Sep. 16, 2020

(86) PCT No.: PCT/JP2020/035017
§ 371 (c)(1),
(2) Date: Aug. 1, 2022

(87) PCT Pub. No.: WO2021/157117
PCT Pub. Date: Aug. 12, 2021

(65) Prior Publication Data
US 2023/0109072 A1   Apr. 6, 2023

(30) Foreign Application Priority Data

Feb. 6, 2020   (JP) ................................ 2020-018905

(51) Int. Cl.
| | | |
|---|---|---|
| *B65G 47/90* | (2006.01) | |
| *B66C 1/44* | (2006.01) | |
| *B65G 61/00* | (2006.01) | |
| *B66C 13/22* | (2006.01) | |

(52) U.S. Cl.
CPC ......... *B65G 47/905* (2013.01); *B65G 47/901* (2013.01); *B65G 61/00* (2013.01);
(Continued)

(58) Field of Classification Search
CPC .......... B23Q 3/183; B23Q 7/18; B23Q 3/186; B65G 47/244; B65G 57/03; B65G 47/901;
(Continued)

(56) References Cited

U.S. PATENT DOCUMENTS 4,423,998 A * 1/1984 Inaba .................... B25J 19/025
                                                                    414/730
4,507,078 A * 3/1985 Tam ..................... H01L 21/681
                                                                    198/346.2
(Continued)

FOREIGN PATENT DOCUMENTS

| JP | 61-176187 U1 | 11/1986 |
| JP | 11-228070 A | 8/1999 |
| JP | 2000-247569 A | 9/2000 |

OTHER PUBLICATIONS

International Search Report dated Nov. 17, 2020 in counterpart International Application No. PCT/JP2020/035017.

(Continued)

*Primary Examiner* — Gregory W Adams
(74) *Attorney, Agent, or Firm* — DLA Piper LLP (US)

(57) ABSTRACT

In a clamping device, the number of components for an article detection means is reduced. In a stacker, a tire is placed on the carry surface. The first gripping member and the second gripping member grip a side of tire placed on the carry surface and include an abutment surface having a bent portion and are capable of abutting with the side of tire. The first sensor and the second sensor include a light axis in a direction along the article. The controller moves the first gripping member and the second gripping member close to each other to the first position where the tire is not gripped. When the tire is detected with the first sensor and second sensor, the controller moves the first gripping member and the second gripping member close to each other to the second position where the tire is gripped.

8 Claims, 20 Drawing Sheets

(52) U.S. Cl.
CPC .............. *B66C 1/445* (2013.01); *B66C 13/22* (2013.01); *B65G 2201/0273* (2013.01); *B65G 2203/0233* (2013.01); *B65G 2203/044* (2013.01)

(58) Field of Classification Search
CPC ...... B65G 57/20; B65G 61/00; B65G 47/905; B65G 2203/0233; B65G 2201/0273; B65G 2203/044; B66C 5/02; B66C 13/46; B66C 13/48; B66C 1/445; B66C 13/22; B66C 1/62; B66F 9/0755; B66F 9/184; B66F 9/187
USPC ...... 414/621, 624, 626, 789.1, 790.2, 794.9, 414/795.2, 936; 294/907; 901/35, 47; 198/345.1, 341.05
See application file for complete search history.

(56) References Cited

U.S. PATENT DOCUMENTS

| | | | | |
|---|---|---|---|---|
| H65 H | * | 5/1986 | Beni | B25J 13/082 414/730 |
| 4,766,322 A | * | 8/1988 | Hashimoto | B25J 19/021 414/730 |
| 4,849,643 A | * | 7/1989 | Mundy | G01B 11/2433 356/601 |
| 5,008,555 A | * | 4/1991 | Mundy | G01B 11/08 250/559.22 |
| 5,177,563 A | * | 1/1993 | Everett | B25J 19/021 356/621 |
| 8,078,315 B2 | * | 12/2011 | McKernan | B66F 9/22 701/1 |
| 9,310,791 B2 | * | 4/2016 | Chhatpar | G05B 19/04 |
| 10,495,444 B2 | * | 12/2019 | Nagataki | G01B 11/005 |
| 2003/0205905 A1 | * | 11/2003 | Chen | H01L 21/67259 294/213 |
| 2015/0174763 A1 | * | 6/2015 | Kimura | H01L 21/681 901/30 |
| 2017/0267469 A1 | * | 9/2017 | Miyoshi | B65G 43/00 |
| 2019/0193954 A1 | | 6/2019 | Shannahan | |

OTHER PUBLICATIONS

Written Opinion dated Nov. 17, 2020 in counterpart International Application No. PCT/JP2020/035017.

\* cited by examiner

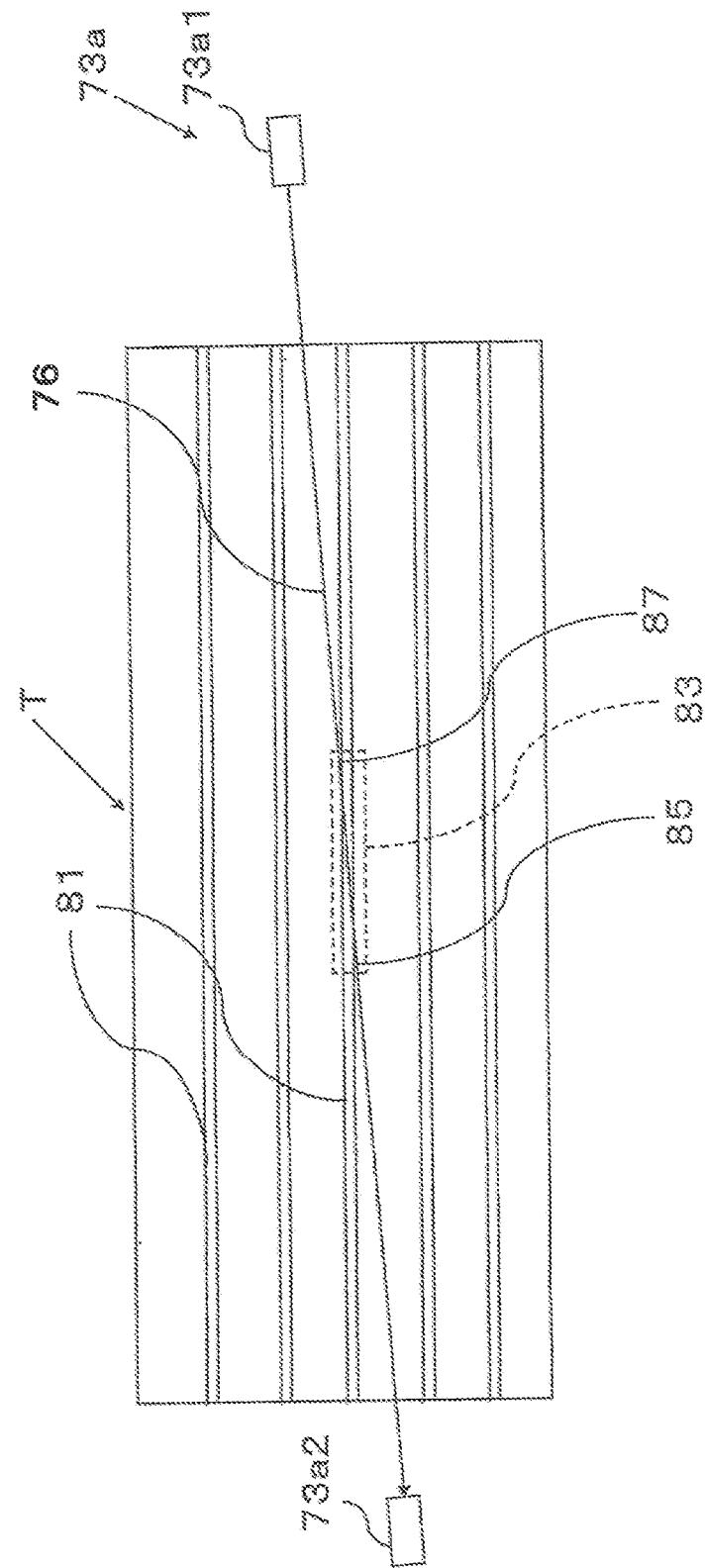

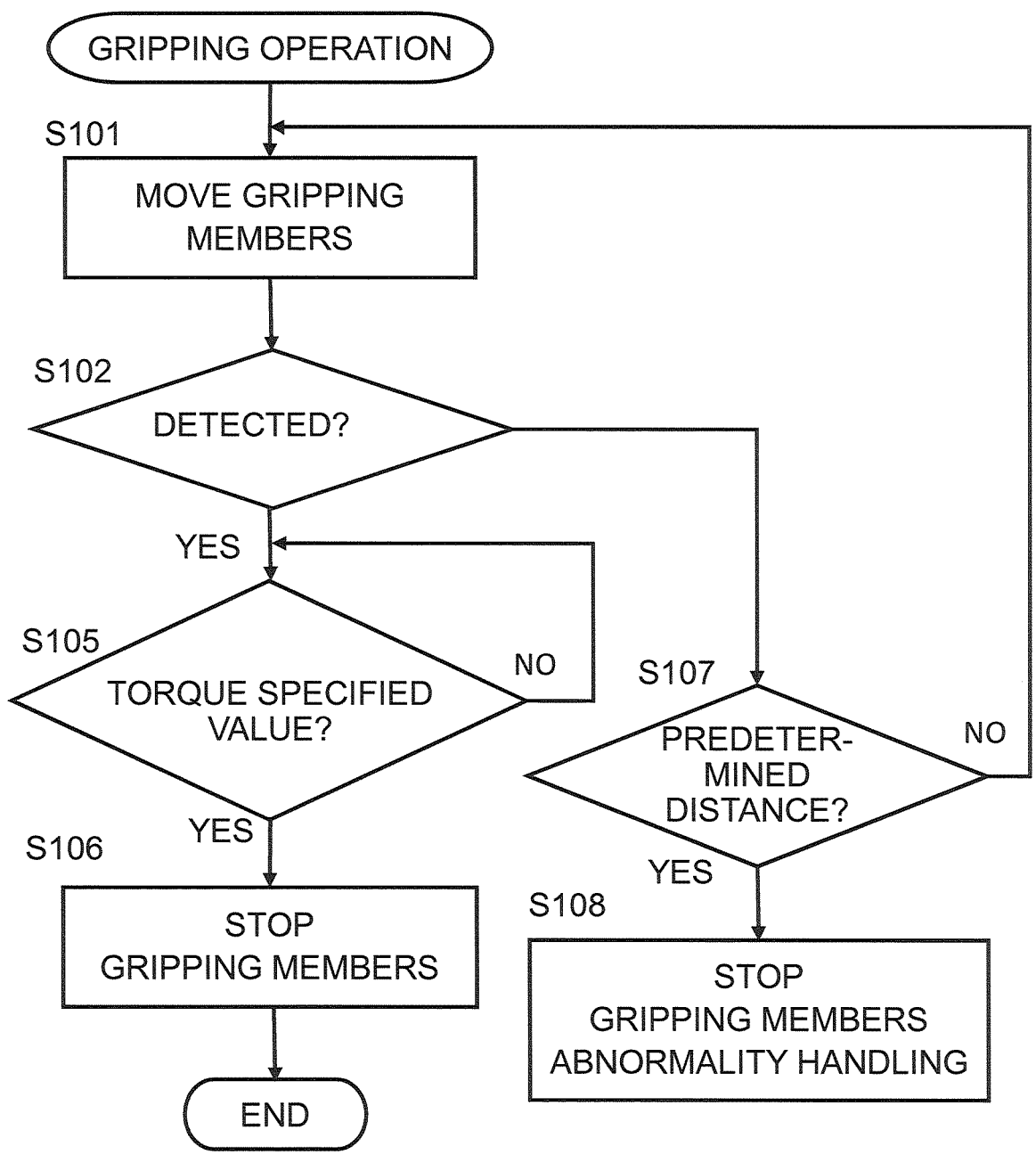

GRIPPING APPARATUS AND STACKER

TECHNICAL FIELD

This disclosure relates generally to a gripping apparatus, and more specially to a gripping apparatus that clamps a round-shaped article.

BACKGROUND

A tire gripping apparatus that grips and moves a tire is well known (for example, refer to Japanese Unexamined Patent Application Publication No. Hei 11-228070).

The tire gripping apparatus of JP '070, which is incorporated into an overhead traveling vehicle, includes a lifting platform, chucking claws, and sensors provided on the chucking claws. The chucking claw of the overhead traveling vehicle placed inside a tire holds the tire from the inside.

The conventional tire gripping apparatus includes a hand to grip a tire and a mechanical detector to detect a position of a tire such as a detection plate detector including a detection plate and a spring. Such mechanical detector generally increases the number of its parts or components.

It could therefore be helpful to provide a gripping apparatus that reduce the number of parts or components of the mechanical detector.

SUMMARY

We thus provide a gripping apparatus including a placement section, a pair of gripping members, sensors, and a controller. The placement section holds a round-shaped article. The pair of gripping members grip a side of the article placed on the placement section and include an abutment surface having a bent portion and capable of abutting the side of the article. The sensor crosses the bent portion and includes a light axis in the direction along the article. The controller moves the pair of gripping members close to each other to a first position where the article is not clamped but detected with the sensor, and receives a detection signal from the sensor. Next, the controller further moves the pair of gripping members close to each other to a second position where the article is gripped. The shape of the bent portion may be, for example, a part of a circular arc or a part of a V-shape in a plan view. For example, the bent portion is an arc of the circular arc or a bent part of the V-shape.

The bent portion enables the pair of gripping members to abut along the side of the round shaped article and further enables the article to be detected before the article comes in contact with the abutment surface.

The controller may confirm detection of the article with the sensor after stopping the pair of gripping members at the first position. Alternatively, the controller may confirm detection of the article with the sensor without stopping the pair of gripping members at the first position. In this example, if the detection of the article cannot be confirmed, the pair of gripping members stop moving after the gripping members pass through the first position.

In the gripping apparatus, the abutment surfaces of the pair of gripping members include the bent portion and the article has a round shape, thus the article can be detected in a non-contact manner before being gripped. Therefore, even if a diameter of the gripped article is different, the article can be detected correctly.

In the gripping apparatus, the sensor is non-contact type, thus reducing its components and parts.

The abutment surface is circular-arc-shaped in a plan view. The sensor may be arranged such that the light axis intersects at two points of the circular arc. The light axis may be parallel to or coincide with the line linking an end portion to another end portion of the circular arc.

In the gripping apparatus, the abutment surfaces of the pair of gripping members are circular arc-shaped and the article has a round shape so that the article can be detected in a non-contact manner before being gripped. Therefore, if a diameter of the gripped article is different, the article can be detected correctly. The sensor of the gripping apparatus is non-contact type, thus reducing its components and parts.

The light axis may be orthogonal to the movement direction of the pair of gripping members. The light axis may link an end portion side to another end portion side of the circular arcs of a first gripping member and a second gripping member in a plan view, respectively. In the gripping apparatus, the article can be detected at a position distanced away from the abutment surface with a non-contact manner, thus the article is sure to be detected.

The article may be a tire having a side surface on which grooves extending in a horizontal direction are formed.

The sensor may be arranged such that the light axis is inclined upward against a horizontal direction. In the gripping apparatus, the light axis is so inclined that the light axis does not insert in the groove of a tire easily. Thus, the tire can be detected correctly. The above 'grooves extending in a horizontal direction' may be lines extending in a horizontal direction in general such as straight lines or zigzag lines.

In response to a detection of the article with the sensor, the controller may stop movement of the gripping member provided with the sensor out of the pair of gripping members.

Even if the article is detected with the sensor, the controller may continue to move the gripping members provided with the sensor out of the pair of gripping members.

If one of the pair of gripping members moves over the predetermined distance and the article is not detected, the controller may stop movement of the gripping member and perform an abnormality handling.

For a first article carried in when there is no article between the pair of gripping members and gripped firstly, the controller moves the gripping members to close to the first position and stop them at the first position. In response to a detection of the first article with the sensor, the controller may move the gripping members close to each other to the second position where the article is gripped.

For a second article which is gripped secondarily or later, the controller may move the pair of gripping members to the second position without stopping them at the first position to grip the second article. After the pair of gripping members stops at the second position for the second article, the controller may check with the sensor that the second article is gripped. In the gripping apparatus, the second article which is gripped secondarily or later is not stopped at the first position, thus reducing the cycle time.

For example, for the first article, the controller moves the pair of gripping members close to each other, stops them at the first position, thus, memorizing the first position allows the controller to determine how far the pair of gripping members move to the second position. This eliminates need for the second article to stop at the first position.

For the first article, the sensor is used to stop the pair of gripping members at the first position. For the second article, the sensor is used to confirm that the pair of gripping members grip the article at the second position. A stacker according to another example includes the above gripping apparatus and a driving device to drive the pair of gripping members horizontally and vertically.

My gripping apparatus is thus capable of reducing components or parts of article detector.

BRIEF DESCRIPTION OF THE DRAWINGS

FIG. 26 is a schematic side view showing the relationship between a tire and a light axis of sensor according to a second preferred example.

FIG. 27 is a flowchart showing gripping operations according to a third preferred example.

REFERENCE SIGNS LIST

Figure 1:
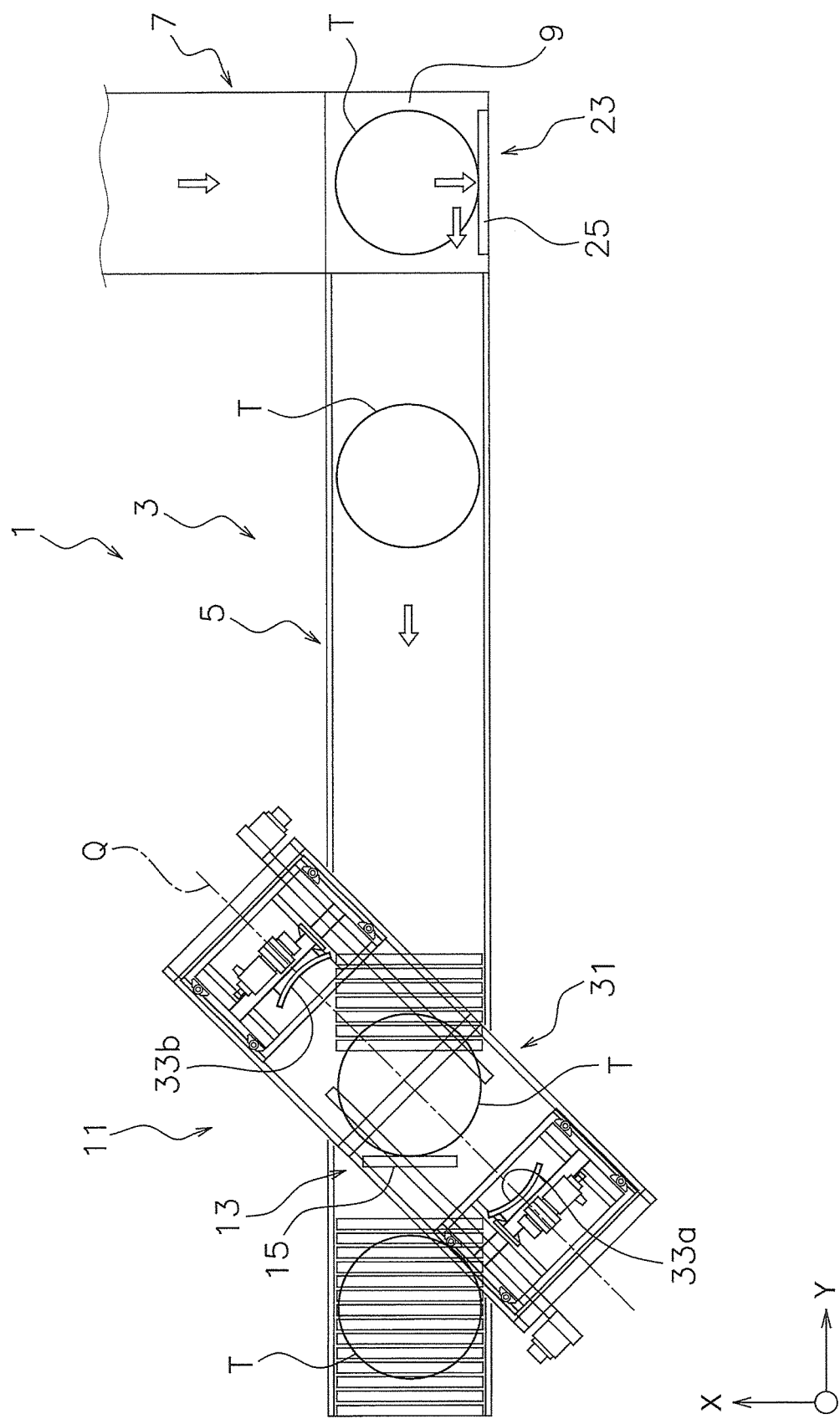
FIG. 1 is a schematic plan view of a carrying system of a first preferred example.

1: Carrying system
3: Conveyor apparatus
5: First conveyor
5a; Carry surface
7: Second conveyor
9: Conversion
11: Centering stack device
13: First positioning device
15: First stopper
17: First stopper driver
23; Second positioning device
25: Second stopper
31: Stacker
31a; mast
31b; ceiling
33a; First gripping member
33b; Second gripping member
34a First horizontal direction driver
34b; Second horizontal direction driver
35a; First vehicle
35b; Second vehicle
36a; First chain
36b; Second chain
37a; First sprocket
37b; Second sprocket
38a; Third sprocket
38b; Fourth sprocket
39a; First grip motor
39b; Second grip motor
41a; First elevator
41b; Second elevator
42a; First lower sprocket
42b; Second lower sprocket
43a; First upper sprocket
43b; Second upper sprocket
44a; First chain
44b; Second chain
45a; First elevating motor
45b; Second elevating motor
46a; First guide
46b; Second guide
61: Stack position
71: Controller
73a; First sensor
73b; Second sensor
74: Tire height sensor
75: Tire arrival sensor
77: Driver
T: Tire

DETAILED DESCRIPTION

1. First Example (1) Entire Carrying System

With reference to FIG. 1, a carrying system of a first example will now be described as follows. FIG. 1 is a schematic plan view of the carrying system of the first example.

A carrying system 1 has a function to carry a tire T (an example of an article) one by one, to stack a plurality of the tires T, and then to carry the stacked tires T.

(2) Conveyer Apparatus

The carrying system 1 has a conveyer apparatus 3 that carries the tire T having a plurality of different-sized types.

The conveyer apparatus 3 includes a first conveyer 5, a second conveyer 7, and a convertor 9. The convertor 9 is disposed between the first conveyer 5 and the second conveyer 7. The tire T are carried in the order of the second conveyer 7, the convertor 9 and the first conveyer 5.

The first conveyer 5 and the second conveyer 7 are orthogonal to each other and the convertor 9 changes the conveying direction of tire T from the conveyer 7 to the conveyer 5.

The first conveyer 5 and the second conveyer 7 are known technique such as a roller conveyer and have a carry surface 5a on which the tires T are conveyed. The convertor 9, which is a known technique, is made of, for example, a roller conveyor and chain conveyors movable between the rollers of roller conveyer. Members of the each device are omitted appropriately to simplify the drawings.

Hereinafter, an extending direction of the first conveyor 5 is referred to as a first direction (a Y direction) and an extending direction of the second conveyer 7 is referred to as a second direction (an X direction).

(3) Centering Stack Device

The carrying system 1 has a centering stack device 11. The centering stack device 11 stacks the tires T while centering them. The stacked tires T are carried into a rack (not shown) directly by use of a robot arm (not shown). Unless each of the tires T is centered accurately, the plurality of tires T may incline and collapse when being gripped by the robot arm. Accordingly, an accurate centering is required. This example provides the centering stack device 11 that can solve the above-described issue (to be described later).

(3-1) First Positioning Device

The centering stack device 11 has a first positioning device 13 that defines a position of an end portion of the tire T carried by the first conveyer 5 as the first predetermined position in the first direction.

The first positioning device 13 has a first stopper 15 provided at the first conveyer 5. The first stopper 15 protrudes upward from the carry surface 5a (an example of placement section) of the first conveyer 5 and is capable of abutting against the tire T carried by the first conveyer 5 in the first direction. The first stopper 15 extends to the second direction.

Figure 2:
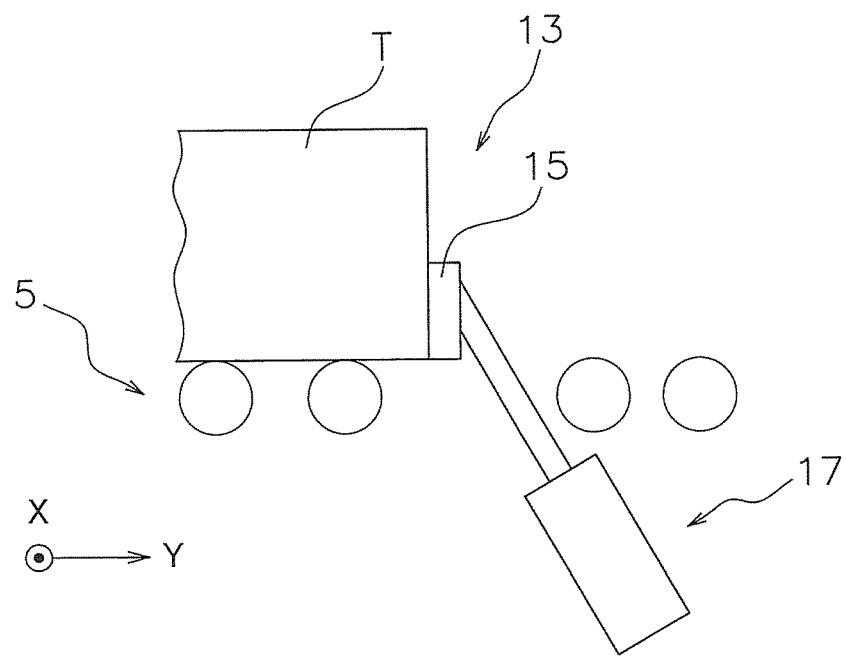
FIG. 2 is a schematic side view of a first positioning device.
Figure 3:
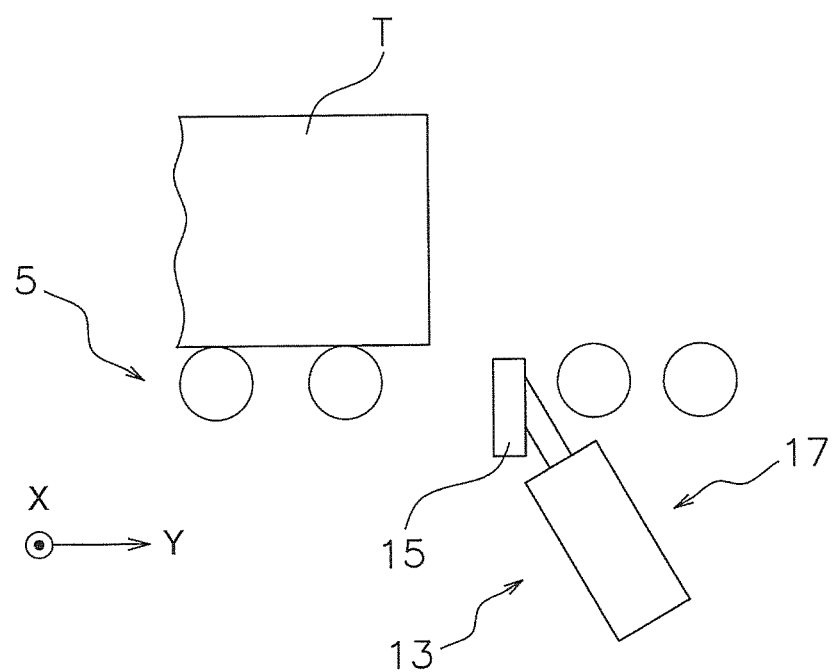
FIG. 3 is a schematic side view of the first positioning device.

With reference to FIGS. 2 and 3, the details of the first positioning device 13 will now be described. FIGS. 2 and 3 are schematic side views of the first positioning device. The first positioning device 13 has a first stopper driver 17 which causes the first stopper 15 to move between the abutment position (FIG. 2) protruding upward from the carry surface 5a and the retreat position (FIG. 3) below the carry surface 5a distanced away obliquely downward from the abutment position at downstream side in a conveyance direction of the tire T. The first stopper driver 17 is, for example, a pneumatic cylinder.

The first stopper 15 of the carrying system 1 moves from the abutment position to the retreat position after the tire T abuts against the first stopper 15. The retreat position is so far from the tire T abutment position in the first direction that the load is not applied easily from the first stopper 15 to the tire T. Therefore, the position or direction of tire T is not changed easily. If rotation or wear of tire T is not considered, the first stopper may move only in the vertical direction.

(3-2) Second Positioning Device

The centering stack device 11 has a second positioning device 23 that defines the end portion of the tire T in the second direction as the second predetermined position. The second positioning device 23 has a second stopper 25 disposed at one side of the second direction (the bottom of the FIG. 1) on the conversion 9. The second stopper 25 protrudes upward from the carry surface 9a of the conversion 9 and is capable of abutting against one side of the tire T.

The second positioning device 23 has a driver 77 (refer to FIG. 10) that moves the second stopper 25 between the abutment position protruding upward from the carry surface 5a and the retreat position distanced away from the abutment position against the tire T in the second direction. The driver 77 may have the same or similar structure as one of the first stopper driver 17 of the first positioning device 13, or may have a structure that allows the second stopper 25 to retreat in the lateral direction. If rotation of the tire T is not considered, the second stopper 25 does not need to be retreated.

The conversion 9 moves the tire T to one side of the second direction (the side of the second stopper 25 on the bottom of FIG. 1) at the upstream side in conveyance direction from the first positioning device 13. This enables the tire T to abut against the second stopper 25 to be positioned in the second direction.

Then, the second stopper 25 moves from the abutment position to the retreat position. The abutment position against tire T is distanced far from the retreat position in the second direction. Thus, a load from the second stopper 25 is not applied easily to the tire T. Therefore, the position or direction of the tire T cannot be changed easily.

Then, the tire T is carried on the first conveyer 5 toward the first positioning device 13 in the first direction. In this process, the tire T is carried without changing the posture or the position determined in the second direction since no guide is provided at the back side (bottom side of FIG. 1) of the first conveyer 5 in the second direction.

The tire T is positioned in the first direction with the first stopper 15 at a stack position 61, which is a position where the tire T is stopped and occupies at the upstream side in a conveyance direction of the first stopper 15. As described above, the tire T is stopped at the stack position 61 on the first conveyer 5 with the first stopper 15 in a state in that the tire T is positioned in each of the first and second directions.

(3-3) Stacker

Figure 4:
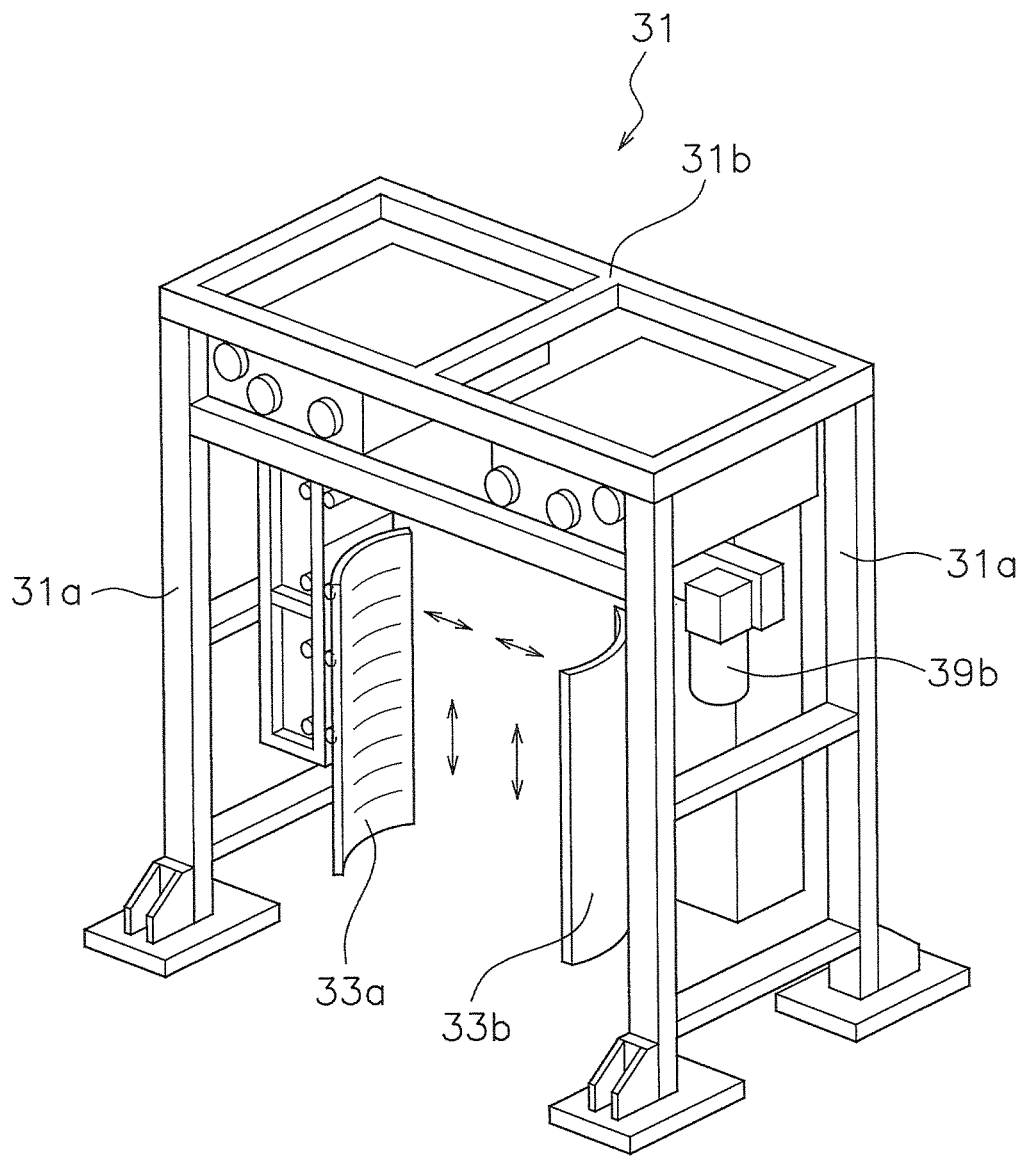
FIG. 4 is a schematic perspective view of a stacker.
Figure 5:
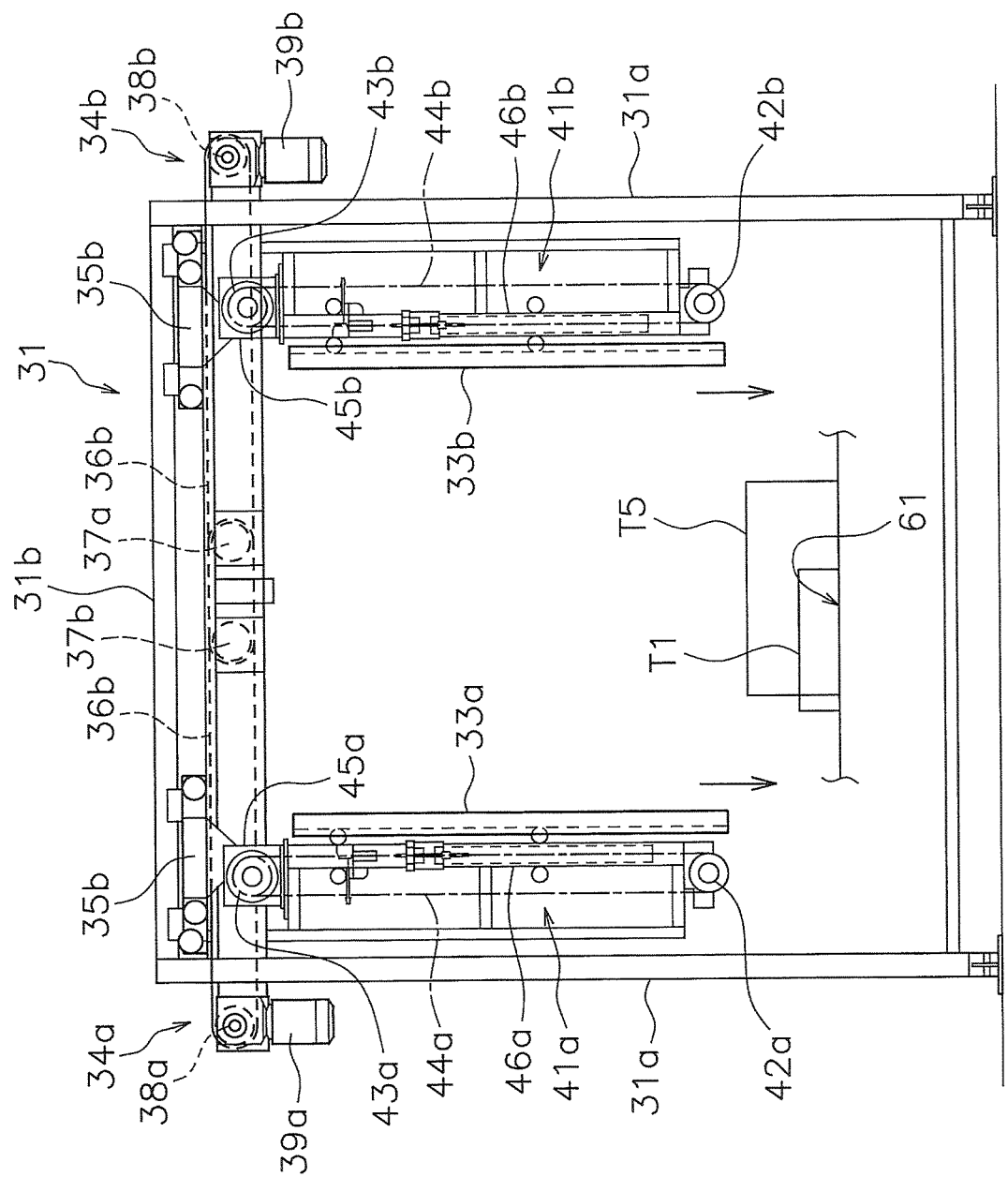
FIG. 5 is a schematic front view of the stacker.

With reference to FIGS. 4 and 5, a stacker will now be described. FIG. 4 is a schematic perspective view of the stacker and FIG. 5 is a schematic front view of the stacker.

The centering stack device 11 has a stacker 31 (an example of gripping apparatus). The stacker 31 is used to stack a centered tire T. The stacker 31 has a pair of masts 31a and a ceiling 31b that connects the masts 31a with each other at the top. The pair of masts 31a are disposed at both sides of the first conveyer 5 across the stack position 61 of the first conveyer 5.

The stacker 31 has a first gripping member 33a and a second gripping member 33b, which grip the sides of one or more tires T. The first gripping member 33a and the second gripping member 33b have a predetermined length in the vertical direction and circular-arc-shaped abutment surfaces 33a1 and 33b1 (an example of bent portion) in a plan view. For example, the first gripping member 33a and the second gripping member 33b can grip and hold a tire T or two through ten stacked tires T at a time. The first gripping member 33a is placed at the same side as the second positioning device 23 in the second direction. The abutment surfaces 33a1 and 33b1 are bent parts and thus, enabling the first gripping member 33a and the second gripping member 33b to abut along the sides of the tire T.

As shown in FIG. 5, the stacker 31 has a first horizontal direction driver 34a and a second horizontal direction driver 34b to move the first gripping member 33a and the second gripping member 33b in the horizontal direction, respectively. The first horizontal direction driver 34a and the second horizontal direction driver 34b has a first vehicle 35a and a second vehicle 35b, a first chain 36a and a second chain 36b which drive the first vehicle 35a and the second vehicle 35b in a horizontal direction, a first sprocket 37a and a second sprocket 37b, a third sprocket 38a and a fourth sprocket 38b, and a first grip motor 39a and a second grip motor 39b, respectively.

The stacker 31 has a first elevator 41a and a second elevator 41b. The first elevator 41a and the second elevator 41b are a pair of devices to elevate the first gripping member 33a and the second gripping member 33b, respectively. The first elevator 41a and the second elevator 41b are provided at the lowers of a first horizontal direction driver 34a and a second horizontal direction driver 34b, respectively.

The first elevator 41a has a first lower sprocket 42a arranged at a lower side in a vertical direction, a first upper sprocket 43a arranged at a upper side in the vertical direction, and a first chain 44a to couple the first lower sprocket 42a and the first upper sprocket 43a to each other. The first gripping member 33a is fixed to the first chain 44a. The first elevator 41a further has a first elevator motor 45a to drive the first upper sprocket 43a to move the first gripping member 33a between an upper position and a lower position. The first elevator 41a further has a first guide 46a to guide the first gripping member 33a in a vertical direction.

The second elevator 41b has a second lower sprocket 42b arranged at a lower side in a vertical direction, a second upper sprocket 43b arranged at an upper side in a vertical direction, and a second chain 44b to couple the second lower sprocket 42b and the second upper sprocket 43b to each other. The second gripping member 33b is fixed to the second chain 44b. The second elevator 41b further has a second elevator motor 45b to drive the second upper sprocket 43b to move the second gripping member 33b between the upper position and the lower position. The second elevator 41b further has a second guide 46b to guide the second gripping member 33b in a vertical direction.

The above 'the upper position' of the first gripping member 33a and the second gripping member 33b means that the bottom ends of the first gripping member 33a and the second gripping member 33b are placed at a height that does not interfere with the lowermost tire T. For example, the upper position may be based on a width of the biggest tire T or based on the types of tire T.

The above 'the lower position' of the first gripping member 33a and the second gripping member 33b is a position where the bottom ends of the first gripping member 33a and the second gripping member 33b do not interfere with the first conveyer 5 when the first gripping member 33a and the second gripping member 33b grip a tire T placed on the first conveyer 5.

As shown in FIG. 5, the first gripping member 33a and the second gripping member 33b are positioned such that the bottom ends thereof are lower than the first lower sprocket 42a and the second lower sprocket 42b at the lower position. Therefore, even the bottommost one of a plurality of the tires T is able to be gripped by the first gripping member 33a and the second gripping member 33b.

As shown in FIG. 5, the first lower sprocket 42a and the second lower sprocket 42b are disposed at a position higher than the top surface of the highest tire T. Thus, in this example, although the first lower sprocket 42a and the second lower sprocket 42b are disposed above the first conveyer 5, the first lower sprocket 42a and the second lower sprocket 42b do not interrupt conveyance of the tire T.

The stacker 31 includes a first sensor 73a and a second sensor 73b (examples of sensors) (Refer to FIGS. 6 and 10), which detect the tires T placed at the predetermined distance from the abutment surfaces 33a1, 33b1 of the first gripping member 33a and the second gripping member 33b, respectively.

The first sensor 73a and the second sensor 73b, which are optical transmission type sensor, include a light emitting section and a light receiving section provided at both right-left ends of the abutment surfaces 33a1, 33b1 of the first gripping member 33a and the second gripping member 33b. The abutment surfaces 33a1, 33a b have holes (not shown) through which the light axes of the first sensor 73a and the second sensor 73b passes.

The light axes of the first sensor 73a and the second sensor 73b that are orthogonal to the movement direction of the first gripping member 33a and the second gripping member 33b, connect the one end portion with another end portion of circular arc of first gripping member 33a and second gripping member 33b in a plan view, respectively. However, the light axis crosses the circular arc by intersecting at the two points of the circular arc in a plan view, whereby the light axis is required to extend in the direction along the tire T. Therefore, for example, the light axis may be parallel to the line described above. In this example, the light axis extends in a horizontal direction.

The stacker 31 has a tire height sensor 74 (FIG. 10) to detect the height of tire T. The type of the sensor 74 is not specifically limited. For example, the tire height sensor 74 may be a plurality of optical transmission type or optical reflection sensors lined up in the height direction, or the distance measuring sensor disposed above the tire T. Further, the position of sensor is not specifically limited. The height of a tire T may be included in the tire information obtained from the upper controller (not shown).

A controller 71 controls a drive amount of the first elevator motor 45a and the second elevator motor 45b in accordance with the height of tire T. This enables elevation amount of the first gripping member 33a and the second gripping member 33b to be minimalized. As a result, an operational efficiency is improved.

The stacker 31 has a tire arrival sensor 75 (FIG. 10) to detect that a tire T arrives at the stack position 61. The sensor 75 is an optical transmission type or light reflection type sensor or optical reflective type sensor installed at both sides of the first conveyer 5. The type of sensors is not specifically limited. A touch sensor installed at the first stopper 15 and detecting a contact with tire T is applicable.

Figure 6:
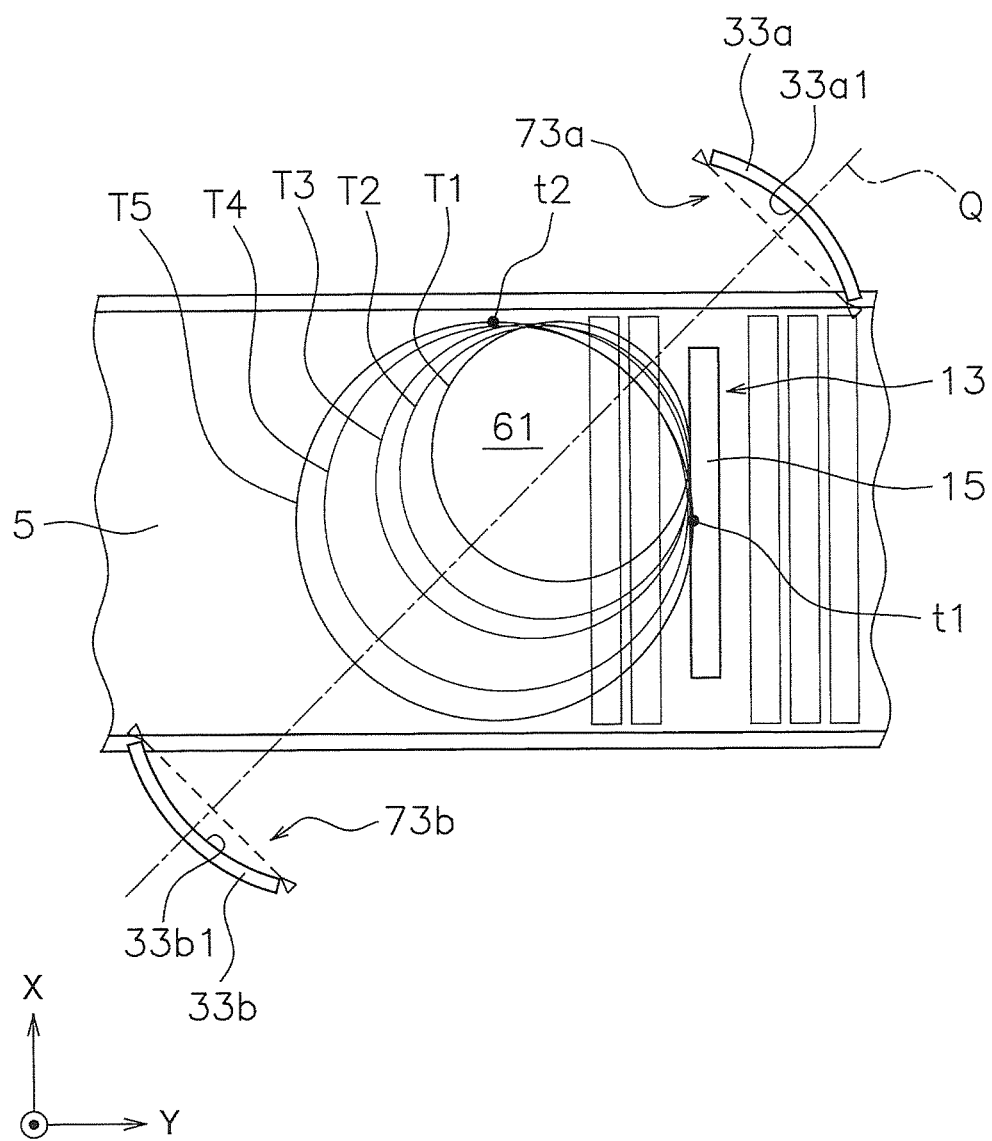
FIG. 6 is a partially schematic plan view showing gripping operations of the stacker.

(3-4) Tire Gripping Operation with First Gripping Member and Second Gripping Member With reference to FIG. 6, a tire T gripping operation performed by the first gripping member 33a and the second gripping member 33b included in the stacker 31 will now be described. FIG. 6 is a schematic partial plan view showing a gripping operation of a stacker.

FIG. 6 shows a plurality of types of tires T1 to T5. These tires include a first tire portion t1 and a second tire portion t2. The first tire portion t1 is an end portion side determined with the first positioning device 13 and the second tire portion t2 is an end portion side determined with the second positioning device 23 after abutting against the first stopper 15 of the first positioning device 13. The position of the first tire portion t1 in the first direction is determined with the first stopper 15. The position of the second tire portion t2 in the second direction is determined with the second stopper 25 of the second positioning device 23 previously. In this example, the tire T does not rotate on the first conveyer 5 so that a portion of the tire T that abuts against the second stopper 25 becomes the second tire portion t2 at the stack position 61. FIG. 6 shows only the first tire portion t1 and the second tire portion t2 of the tire T5.

Figure 7:
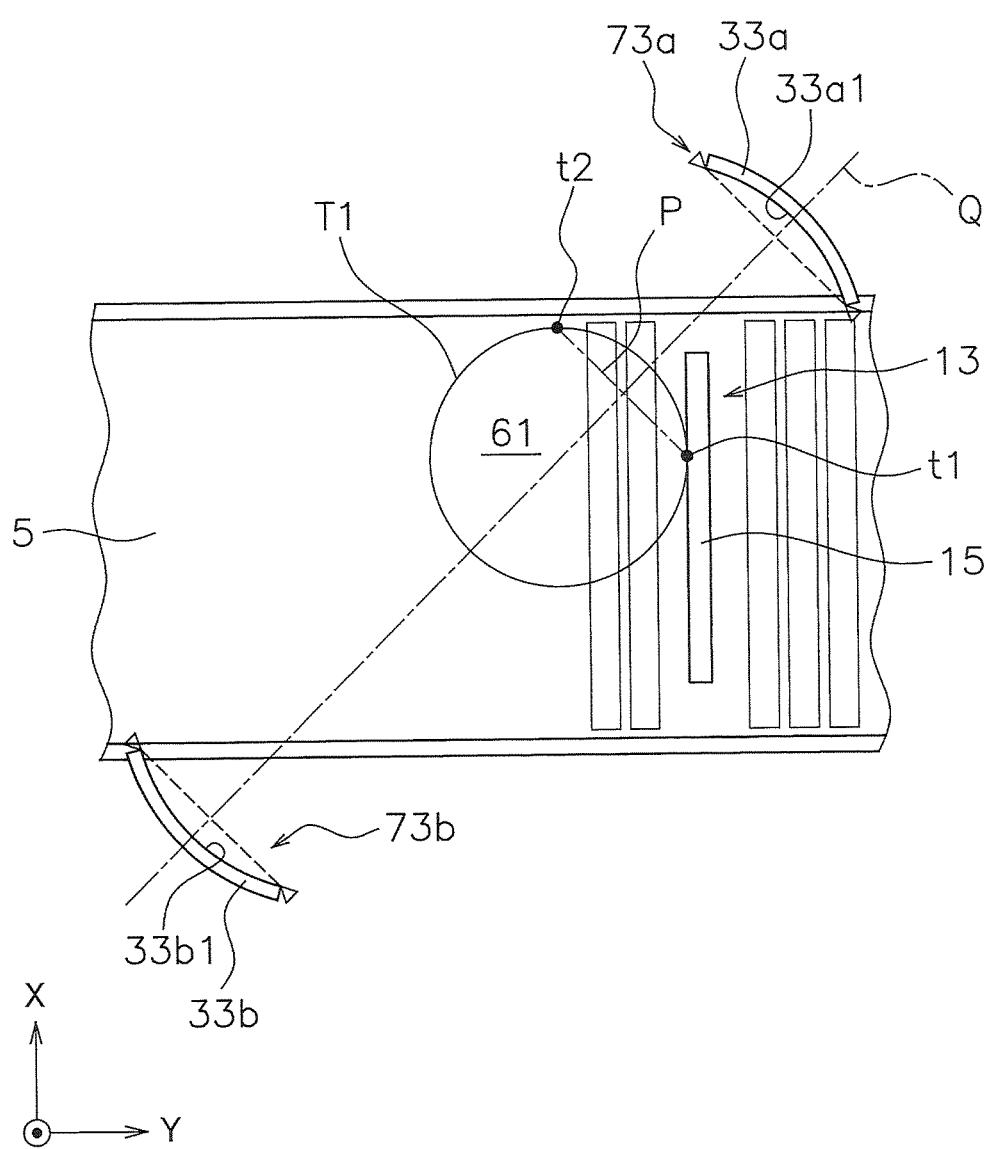
FIG. 7 is a partially schematic plan view showing gripping operations of the stacker.
Figure 8:
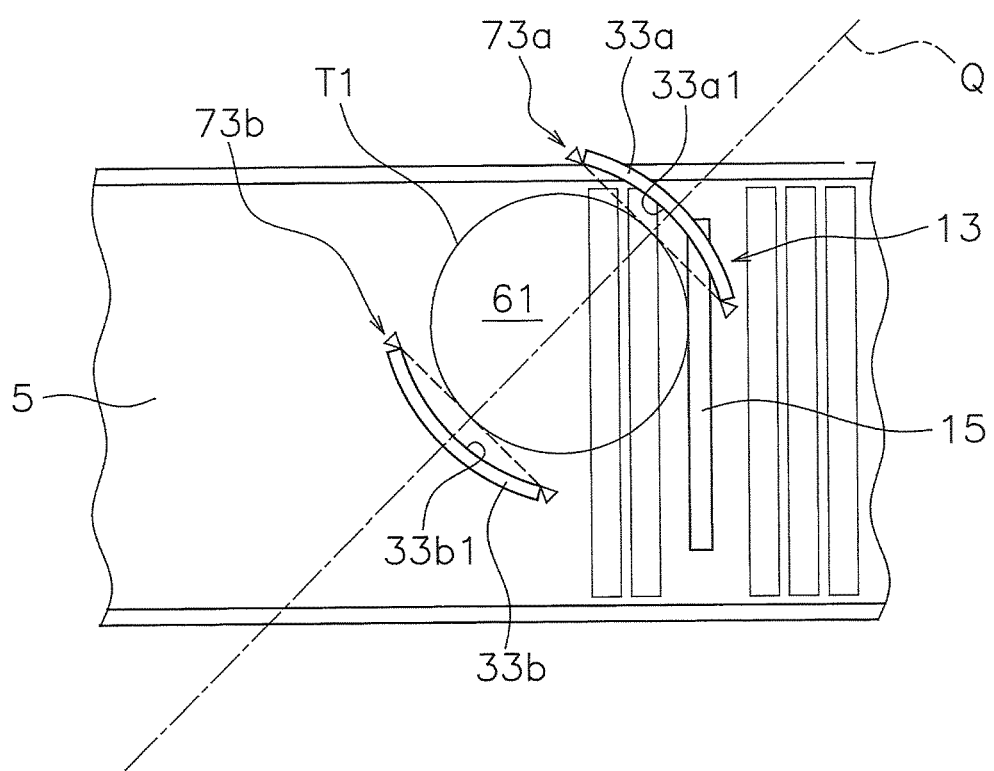
FIG. 8 is a partially schematic plan view showing gripping operations of the stacker.
Figure 9:
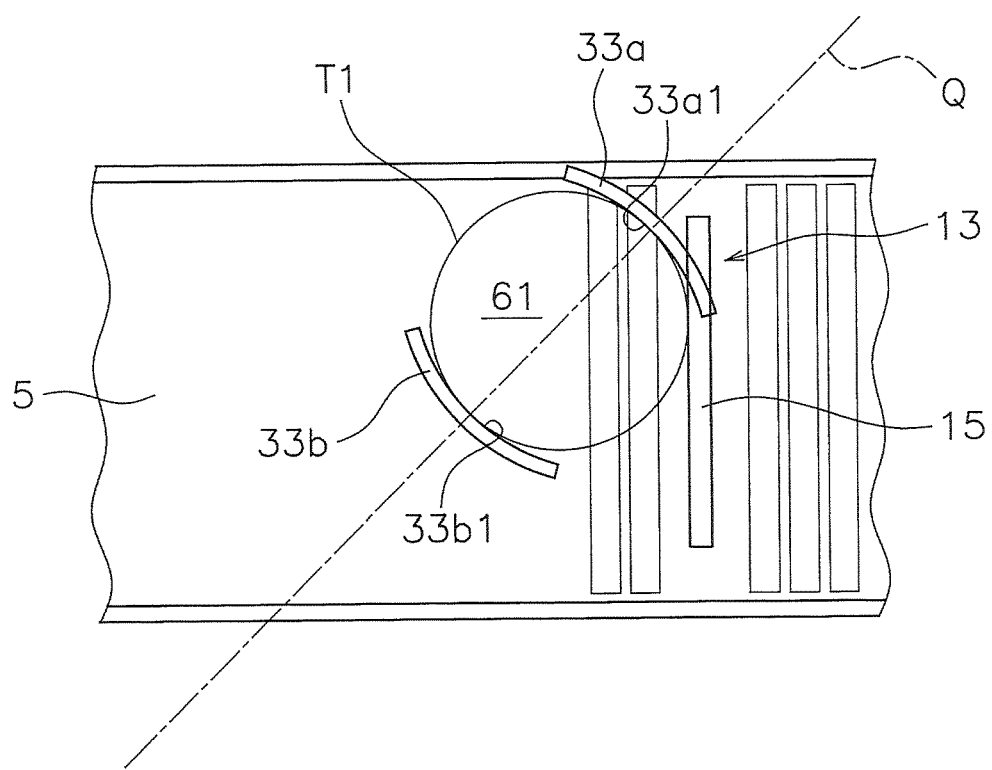
FIG. 9 is a partially schematic plan view showing gripping operations of the stacker.

With reference to FIGS. 7 to 9, an example of stacker gripping operations will now be described. The FIGS. 7 to 9 are schematic partial plan views showing the stacker gripping operations. The tire T1 has the smallest size, that is, the shortest outside diameter. The first gripping member 33a and the second gripping member 33b pass between the first tire portion t1 and the second tire portion t2 of the tire T1 to grip the sides of the tire T. In particular, the first gripping member 33a and the second gripping member 33b grip the tire T obliquely against the first direction at the midpoint of a direct line P connecting the first tire portion t1 with the second tire portion t2. more specifically, the first gripping member 33a and the second gripping member 33b may grip the tire T in the third direction (the extending direction of a direct line Q, clamp direction) horizontally orthogonal to the straight-line P. Further more specifically, the first gripping member 33a and the second gripping member 33b pass between the first tire portion t1 and the second tire portion t2 (on the straight-line P) and may grip the tire T obliquely at a 45-degree angle against the first direction. As described above, the center of the gripping direction coincides with the center of the tire T so that the first gripping member 33a and the second gripping member 33b can grip correctly the tire T having a different-sized outside diameter. Further, the first positioning device 13 and the stacker 31 can be compact. In this example, regardless of types of tire T, the center of grip direction is consist with the center of tire T, because the tire T is round-shaped and the center can be determined by positioning two points.

Next, the tire gripping operation will be now described.

As shown in FIG. 7, the tire T1 is positioned by the first stopper 15. As shown in FIG. 8, the first gripping member 33a and the second gripping member 33b move to the first position close to the side of the tire T1. The arrival at the first position is detected with the detection signal from the first sensor 73a and the second sensor 73b. The first gripping member 33a and the second gripping member 33b that have the first sensor 73a and the second sensor 73b, respectively, are bend and this enables the tire T1 to be detected before the first gripping member 33a and the second gripping member 33b abut against the tire T1.

As shown in FIG. 9, the first gripping member 33a and the second gripping member 33b arrive at the second position where the gripping members 33a and 33b abut against the side of the tire T1 to grip the tire T1. The detection signal from the first sensor 73a and the second sensor 73b confirms that the first gripping member 33a and the second gripping member 33b are gripping the tire T1.

In the stacker 31 according to this example, the tire T having a different-sized outside diameter can be detected in a non-contact manner before being gripped since the abutment surfaces 33a1, 33b1 of the first gripping member 33a and the second gripping member 33b are arc-shaped in a plan view. Further, the first sensor 73a and the second sensor 73b are non-contact sensors so that mechanical parts or components of the tire detector can be reduced.

(4) Structure that Controls the Stacker

Figure 10:
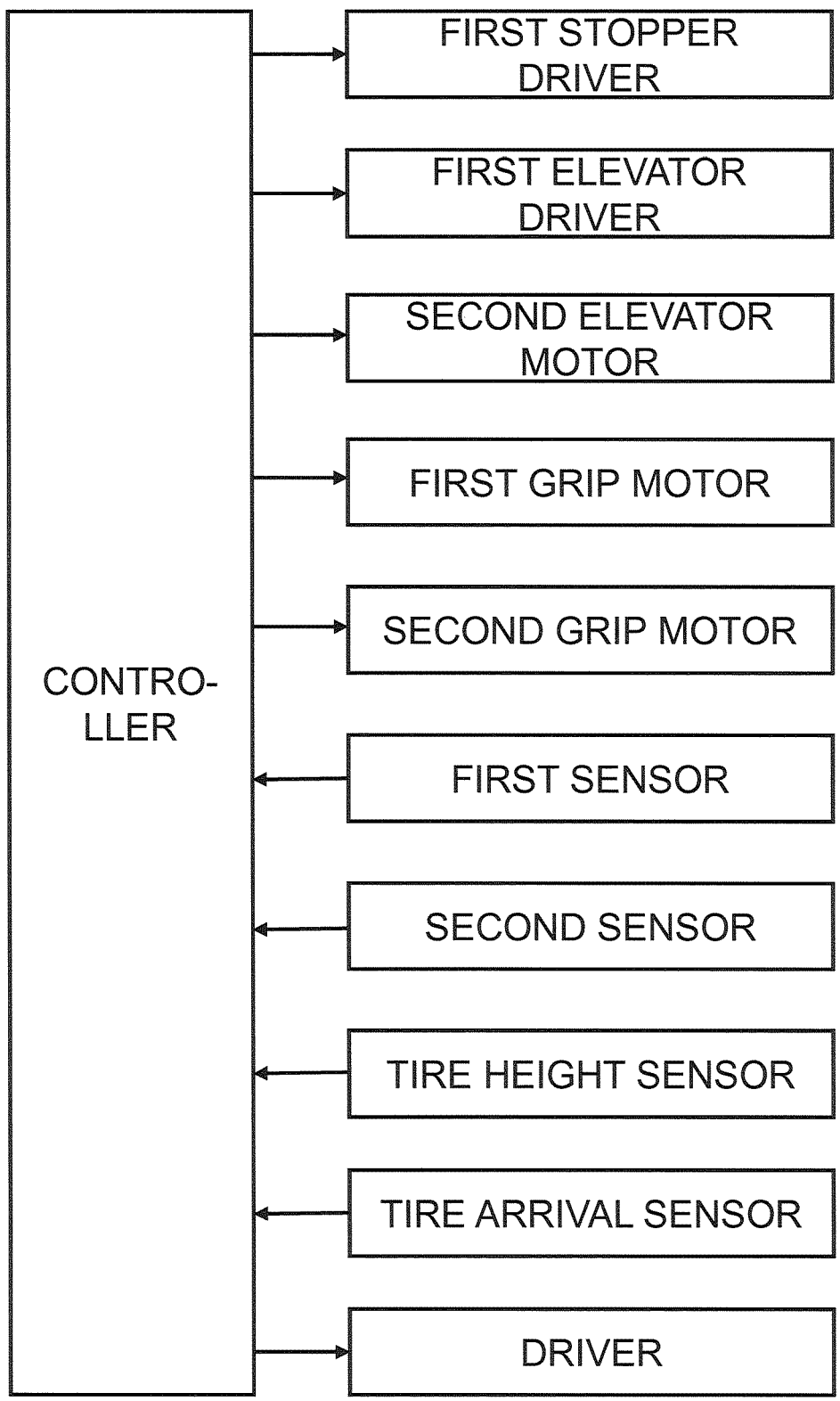
FIG. 10 is a block diagram showing a control structure of the stacker.

With reference to the block diagram of FIG. 10, the structure that controls the stacker 31 will now be described.

The stacker 31 has a controller 71 (an example of controller), which is a computer system including a processor such as CPU, a memory device such as ROM, RAM, HDD, and SSD, and various interfaces such as A/D convertor, D/A convertor, and communication interface. The controller 71 runs program stored in a memory (corresponding to a part or all of memory areas of memory device) to perform various control operations.

The controller 71 may be made of a single processor or a plurality of independent processors for each control.

Each element of the controller 71 may function partially or all as a program executable with the computer system included in the controller 71. The functions of each element of the controller 71 may be partially made up of a custom IC.

The controller 71 is connected to the first stopper driver 17, the first elevator motor 45a, the second elevator motor 45b, the first grip motor 39a, the second grip motor 39b, the first sensor 73a, the second sensor 73b, the tire height sensor 74, and the tire arrival sensor 75. The controller 71 is connected with a sensor (not shown) to detect the size, the shape, or the position of the tire T, a sensor (not shown) and a switch (not shown) to detect the condition of each device, and an information input device (not shown).

(5) Stack Controlling Operation

Figure 11:
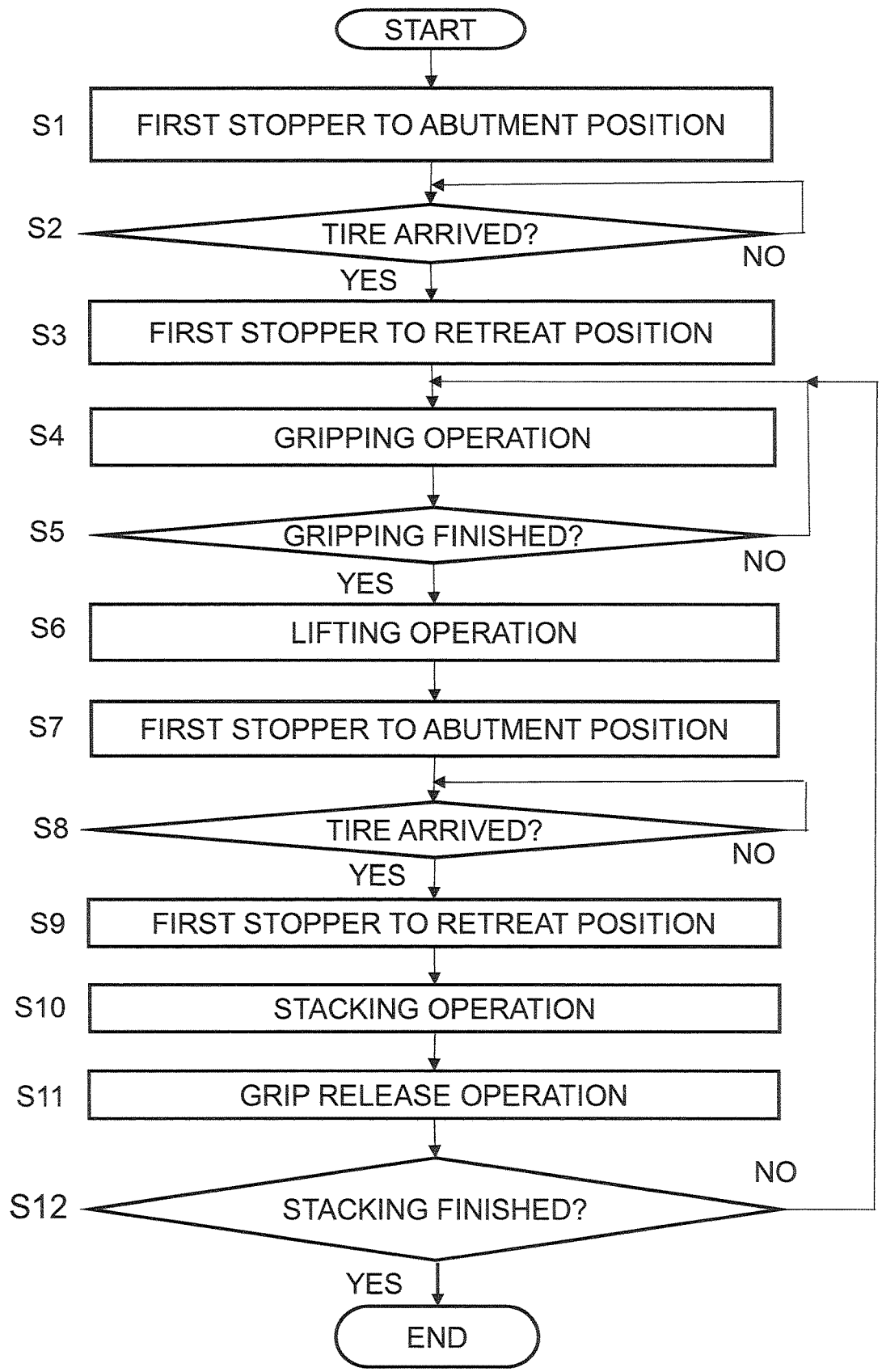
FIG. 11 is a flowchart showing stack controlling operations.
Figure 12:
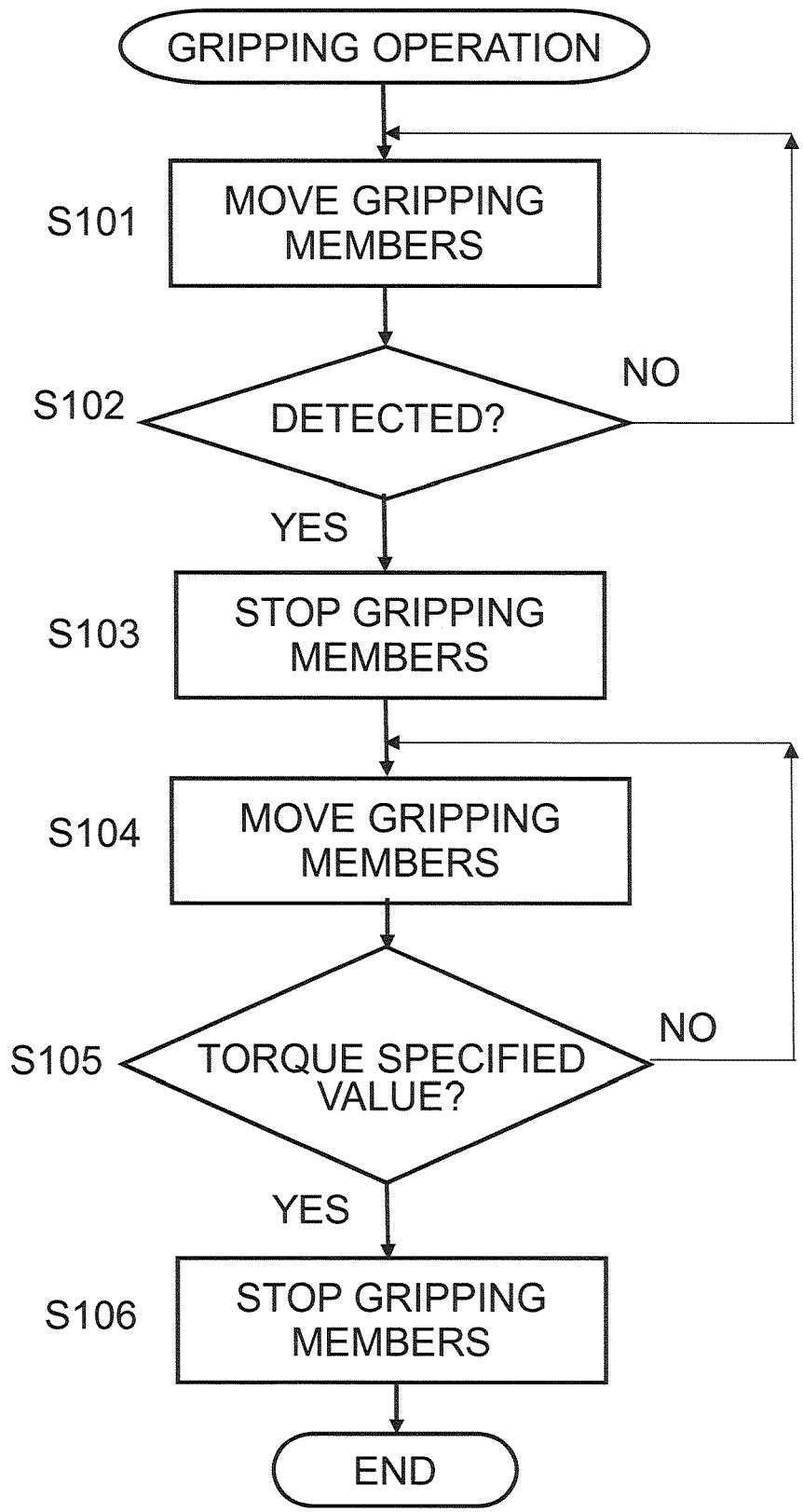
FIG. 12 is a flowchart showing gripping operations.

With reference to FIGS. 11 to 25, the stack control operations will now be described. FIG. 11 is a flowchart showing stack controlling operations. FIG. 12 is a flowchart showing tire gripping operations. FIGS. 13 to 25 are schematic diagrams showing an operating status of a pair of gripping members during stack operations.

The control flowchart described below is an example and each step can be removed or replaced as appropriate. A plurality of steps can be executed at a time or a part or all of steps can be executed together.

Each step of the control flowchart is not limited to a single control operation and can be replaced to a plurality of control operations represented by a plurality of steps.

The operation of each device, which is a result of instruction from the controller 71 to each device, is represented by each step of the software application. During stack control operations described below, a series of operations are performed to stack the same size (type) tires T. After the series of operations are finished, a different size (type) tires T are stacked. However, the size (type) of tire does not need to be changed every operation.

Before the below operations, the tire T is positioned in the second direction with the second positioning device 23.

At step S1 of FIG. 11, the first stopper 15 moves to the abutment position. In particular, the controller 71 controls the first stopper driver 17 to move the first stopper 15 to the abutment position.

Figure 13:
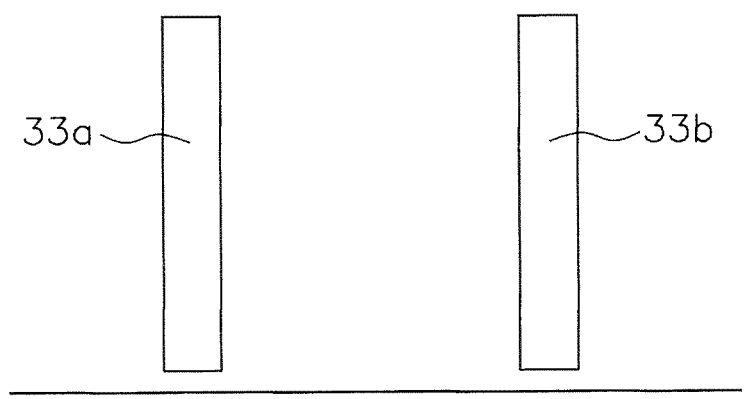
FIG. 13 is a schematic view showing one condition of operations of a pair of gripping members in stacking operations.
Figure 14:
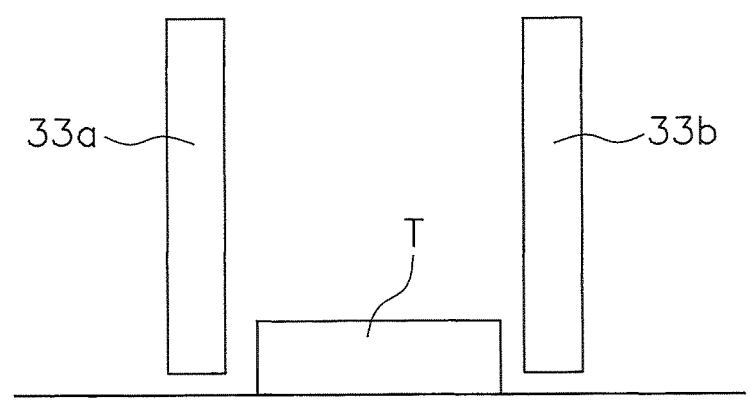
FIG. 14 is a schematic view showing one condition of operations of a pair of gripping members for stacking operations.

At step S2, the controller 71 detects the tire T arrival at the stack position 61 based on the detection signal from the tire arrival sensor 75. As shown in FIGS. 13 to 14, after the tire T arrives, the process goes to step S3.

At step S3, the first stopper moves to the retreat position. In particular, the controller 71 controls the first stopper drive 17 to execute the above operation.

At step S4, the first gripping member 33a and the second gripping member 33b grip the tire T.

Figure 15:
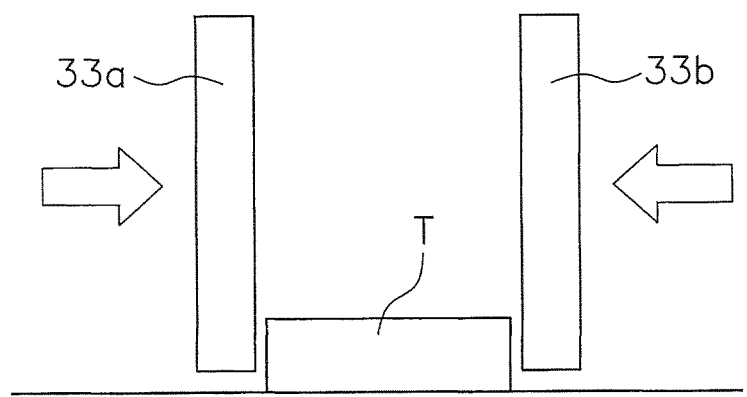
FIG. 15 is a schematic view showing one condition of operations of a pair of gripping members for stacking operations.

With reference to FIG. 12, operations of the first gripping member 33a will now be described (the same for the second gripping member 33b). At step S101, the first gripping member 33a moves toward the tire T. At step 102, whether the tire T is detected or not with the first sensor 73a is judged. If detected (if controller receives a detection signal from the first sensor 73a), the process goes to step S103. If not detected, the process returns to step S101. At step S103, as shown in FIG. 15, the first gripping member 33a stops at the first position close to the side of tire T (the tire T is not gripped). Before proceeding from step S103 to S104, as the condition for transferring from step S103 to step S104, status of the second gripping member 33b needs to be checked to prevent the second gripping member 33b from pushing the tire T when gripping.

Figure 16:
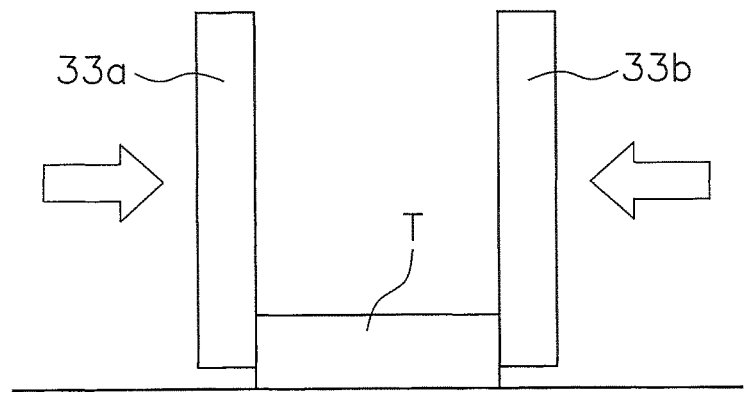
FIG. 16 is a schematic view showing one condition of operations of a pair of gripping members for stacking operations.

At step S104, the first gripping member 33a further approaches the tire T and then, as shown in FIG. 16, arrives at the second position to abut against the side of the tire T. At step S105, whether the torque value of the first grip motor 39a reaches or not the specified value is judged. If reaches, the process goes to step S106. If not reach, the process returns to step S104. At step S106, the movement of the first gripping member 33a is stopped.

At step S5 of FIG. 11, completion of the gripping operations is awaited. The controller 71 judges the completion of gripping operations, for example, based on torque of the first grip motor 39a and the second grip motor 39b.

Figure 17:
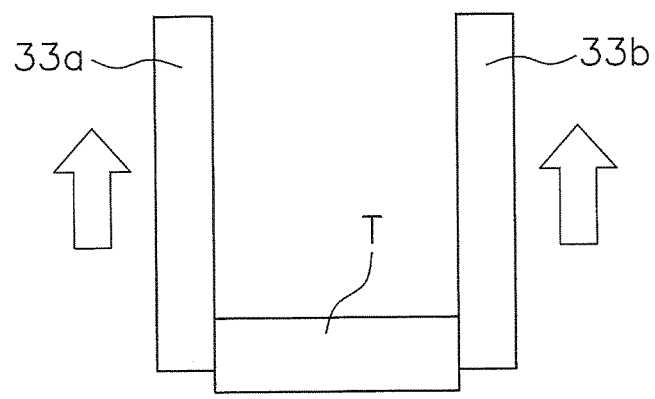
FIG. 17 is a schematic view showing one condition of operations of a pair of gripping members for stacking operations.

At step S6, as shown in FIG. 17, the first gripping member 33a and the second gripping member 33b will go up to lift the tire T. In particular, the controller 71 controls the first elevator motor 45a and the second elevator motor 45b to perform the above operation.

At step S7, the first stopper 15 moves to the abutment position.

Figure 18:
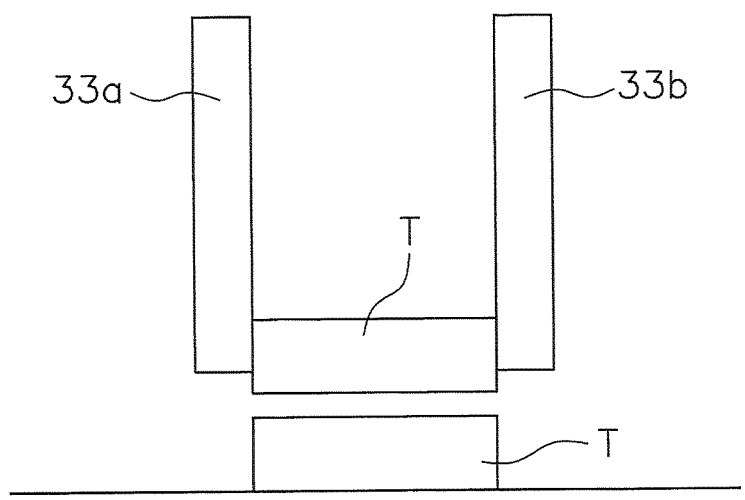
FIG. 18 is a schematic view showing one condition of operations of a pair of gripping members for stacking operations.

At step S8, the next tire T arrives at the stack position 61. The controller 71 judges the arrival based on the detection signal from the tire arrival sensor. As shown in FIG. 18, the process goes to step S9 in response to arrival of the next tire T.

At step S9, the first stopper 15 moves to the retreat position.

Figure 19:
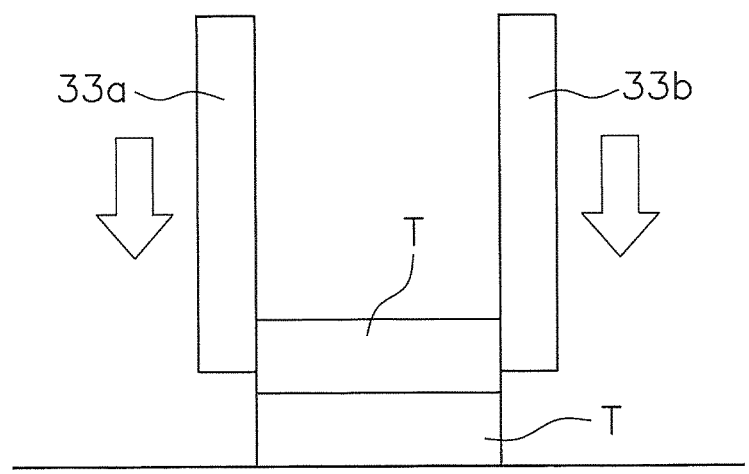
FIG. 19 is a schematic view showing one condition of operations of a pair of gripping members for stacking operations.

At step S10, as shown in FIG. 19, descending of the first gripping member 33a and the second gripping member 33b moves a gripped tire T down to another tire located thereunder. In particular, the controller 71 controls the first elevator motor 45a and the second elevator motor 45b to perform the above operation. In this process, these tires T are positioned at two points with the first positioning device 13 and the second positioning device 23, thus enabling to be stacked and centered precisely to each other.

Figure 20:
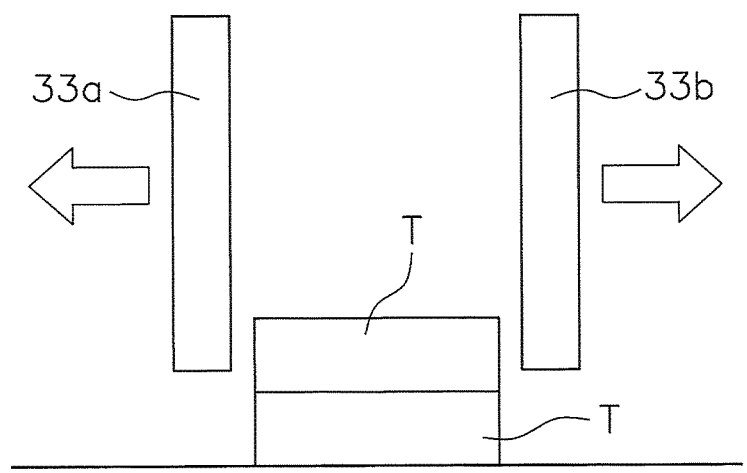
FIG. 20 is a schematic view showing one condition of operations of a pair of gripping members for stacking operations.

At step S11, as shown in FIG. 20, an outward moving of the first gripping member 33a and the second gripping member 33b releases the grip. In particular, the controller 71 controls the first grip motor 39a and the second grip motor 39b to perform the above operation. The movement distance of the first gripping member 33a and the second gripping member 33b may be controlled with a timer. The first gripping member 33a and the second gripping member 33b are separated in the same or different distance.

At step S12, whether stacking operations are completed or not is judged. If completed, the process is finished. If not, the process returns to step S4. After the process is finished, the first conveyer 5 conveys the stacked tires to the downstream side in conveyance direction.

Figure 21:
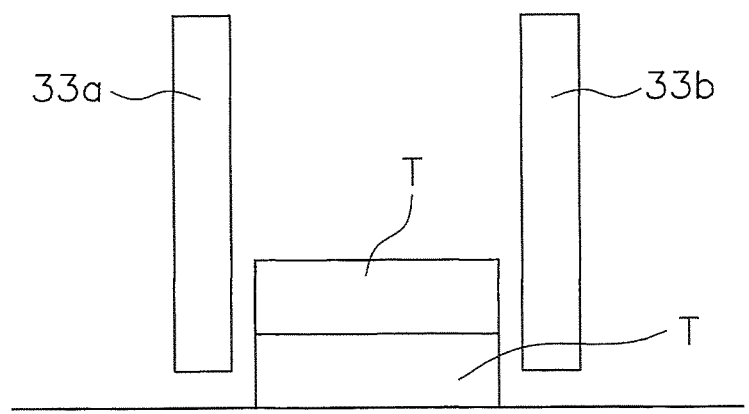
FIG. 21 is a schematic view showing one condition of operations of a pair of gripping members for stacking operations.
Figure 22:
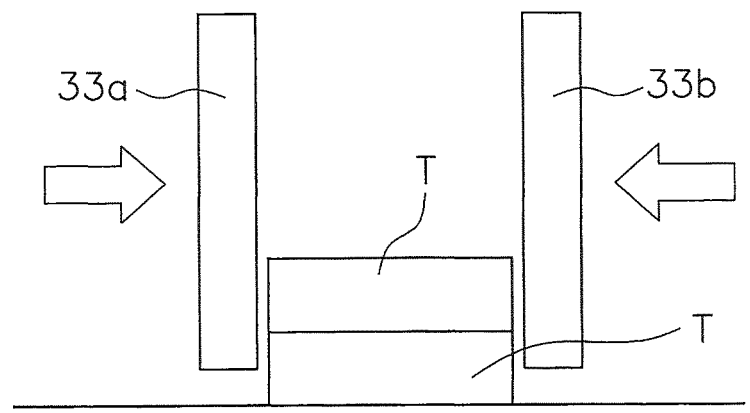
FIG. 22 is a schematic view showing one condition of operations of a pair of gripping members for stacking operations.
Figure 23:
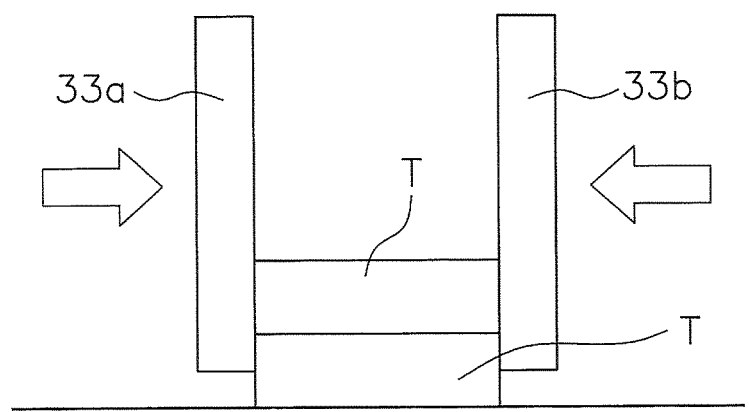
FIG. 23 is a schematic view showing one condition of operations of a pair of gripping members for stacking operations.
Figure 24:
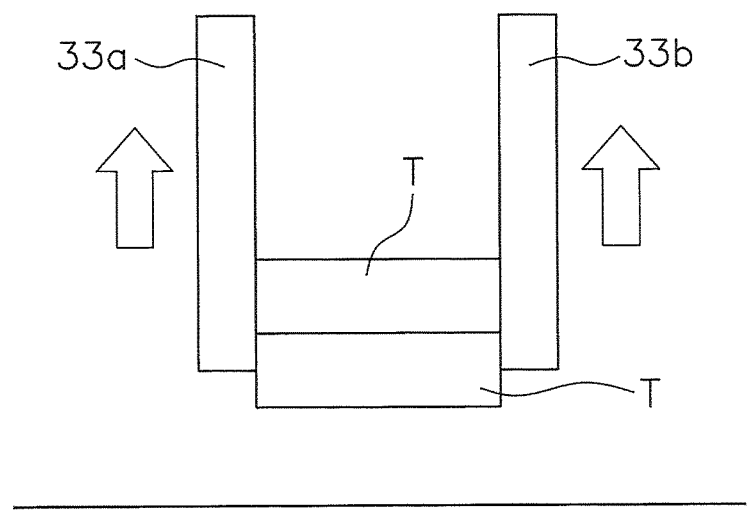
FIG. 24 is a schematic view showing one condition of operations of a pair of gripping members for stacking operations.
Figure 25:
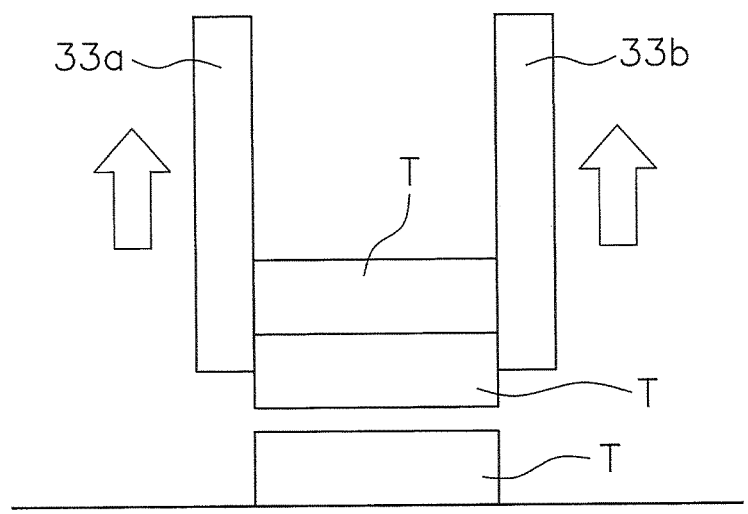
FIG. 25 is a schematic view showing one condition of operations of a pair of gripping members for stacking operations.

Operations at steps S4 to S11 are repeated the predetermined times. For example, at step S4, as shown in FIGS. 21 to 23, operations to grip a tire is performed. In the second and subsequent gripping operations, the detection signal from the first sensor 73a and the second sensor 73b is used only to confirm the existence of the tire T (to be described later). At step S6, as shown in FIG. 24, the tire T is lifted up. At step S8, as shown in FIG. 25, further next tire T is awaited. Subsequent descriptions will be omitted.

In the carrying system 1, the position of tire T in the first direction is determined with the first positioning device 13 and the position in the second direction is determined with the second positioning device 23. The tire T is gripped between the first portion t1 of a tire and the second portion t2 of a tire with the first gripping member 33a and the second gripping member 33b. Accordingly, even the tire T with a different-sized outer diameter can be gripped correctly.

For the tire T carried in first when there is no article between the first gripping member 33a and the second gripping member 33b, the controller 71 moves the first gripping member 33a and the second gripping member 33b close to each other and stop them at the first position. Then, the controller 71 can memory the stop position and the grip position to determine the movement distance to the second position. Therefore, for the tire T carried in secondarily or later, the controller 71 may move the first gripping member 33a and the second gripping member 33b to the second position without stopping at the first position to grip the tires T. After the first gripping member 33a and the second gripping member 33b stop at the second position for the tire T carried in secondarily or later, the controller 71 confirms using the first sensor 73a and the second sensor 73b that the tire T is gripped.

In the gripping apparatus, the tire T carried in secondarily or later is not stopped at the first position, thus reducing the cycle time.

As described above, for the tire T carried in first, the first sensor 73a and the second sensor 73b are used to stop the first gripping member 33a and the second gripping member 33b at the first position. For the tire T carried in secondarily or later, the first sensor 73a and the second sensor 73b are used to confirm that the first gripping member 33a and the second gripping member 33b grip the tire T at the second position. The above control is usable for tire stacking and tire unstacking operations. In the tire stacking operation, the tire T carried in firstly is a first article and the tire T carried in secondarily or later is a second article.

In the tire unstacking operation, the bottommost tire T of the stacked tires T is a first article and the second and subsequent tires T from the bottom is a second article.

The operations after tires T are stacked will now be described as follows.

After tires T are stacked, for example, the stacked tires T are conveyed together by using a carrier which holds tires T at the inside or the lower side of the tires T. Although the stacked tire T is closer to one side in the second direction, the center of the tire T can be adjusted to the transfer position due to the same mechanism as a second direction adjustment conveyor.

Therefore, the carrier can hold the tire T at the fixed position.

2. Second Preferred Example

The light axis of the first sensor and the second sensor in the first example is horizontal, however, may slant in a vertical direction.

With reference to FIG. 26, such an example will now be described as a second example. FIG. 26 is a schematic side view showing an association between a tire and light axes of sensors according to the second example. The basic structures and operations are the same as those of the first example and different points will now be described as follows. The first sensor 73a and the second sensor 73b have the same structures, thus only details of the first sensor 73a will be described.

The first sensor 73a detects a tire T located at the predetermined distance from the abutment surface of the first gripping member 33a and the second gripping member 33b.

The light axis 76 of the first sensor 73a is located to slant upward with respect to horizontal direction. In this example, a light emitting section 73a1 and a light receiving section 73a2 are installed on the upper side and the lower side, respectively. They may be installed upside down.

A slanting angle of the light axis 76 is at approximately 5 degrees. The above angle can prevent the light axis 76 from penetrating into a groove 81 (to be described later) of tire T to ensure detection of a largest outer surface of the tire T.

The tire T shown in FIG. 26 has a plurality of grooves 81 extending in the circumference direction. In this example, as described above, the light axis 76 of the first sensor 73a is slant, which prevents the light axis 73 from penetrating into the groove 81. As a result, the tire T can be correctly detected. In particular, as shown in FIG. 26, a detection area 83 on the top of gripping direction of the tire T is detected with the sensor. In this example, areas 85, 87 at both sides of the detection area 83 therewithin are detected. If horizontal grooves are formed as the tire T and the light axis is horizontal, the light axis will penetrate into the grooves within the detection area and detection of the tire T will be delayed so that the detected position may be incorrect. However, in this example, such detection delay is avoidable.

3. Third Preferred Example

In the first example, a controller confirms the detection of tire T with a sensor after a pair of gripping members stop at the first position. However, a controller may confirm the detection of tire T with a sensor without stopping the gripping members at the first position. In this example, if the detection of tire T cannot be confirmed, the pair of gripping members are stopped after passing the first position.

With reference to FIG. 27, such examples will now be described as a third preferred example. FIG. 27 is a flowchart showing a gripping operation in the third example.

Hereinafter, the operations of a first gripping member 33a will now be described (the same for a second gripping member 33b).

At step S101, the first gripping member 33a moves toward the tire T. At step S102, whether the first sensor 73a has detected the tire T or not is judged. If detected, the process goes to step S105, and if not detected, the process goes to the step S107. As conditions for proceeding from step S102 to S105, the status of the second gripping member 33b is checked to prevent the tire T from being pushed when being gripped. As a result, the first gripping member 33a moves to the second position to abut the sides of the tire T.

At step 105, whether the torque value of the first grip motor 39a has achieved the specified value or not is judged. If achieved, the process goes to step S106. If not achieved, operation of step S105 is performed again.

At step 106, movement of the first gripping member 33a is stopped, and at step 107, whether the movement distance of the first gripping member 33a is over the predetermined distance or not is judged. If over the predetermined distance, the process goes to step S108. If not, the process returns to step S101. At step S108, the movement of first gripping member 33a is stopped and an abnormality handling is performed.

If one of the first gripping member 33a and the second gripping member 33b is not detected, the operations of both of these gripping members are stopped.

The above 'predetermined distance' is determined, for example, for each tire T. In particular, the 'predetermined distance' is defined such that the distance between the first gripping member 33a and the second gripping member 33b is the same as or smaller than the width that allows the tire T to be detected with non-contact, or the same as or smaller than the diameter of the tire T.

4. Common Matter of Preferred Example

The following are common among the first to the third examples.

The gripping apparatus such as a stacker 31 includes a placement section, a pair of gripping members, sensors, and a controller.

The placement section such as a carry surface 5a holds round-shaped articles such as tires T.

The pair of gripping members such as a first gripping member 33a and a second gripping member 33b grip the sides of an article placed on the placement section and include an abutment surface (such as abutment surfaces 33a1, 33b1) including a bent part and capable of abutting against the side of the article.

The sensors such as a first sensor 73a and a second sensor 73b crosses a bent portion and have a light axis in the direction along an article.

The controller such as a controller 71 moves the pair of gripping members close to each other toward the first position (for example, FIG. 8) where an article is not gripped. In response to a detection of the article with the sensor, the controller moves the pair of gripping members close to each other to the second position where the article is gripped (for example, FIG. 9).

As described above, the pair of gripping members have the bent portion and the article is round-shaped so that the article can be detected with non-contact before being gripped. Therefore, even the article having a different-sized diameter can be correctly detected.

As described above, the sensor is a non-contact type, thus enabling to reduce parts or components of a tire detector.

5. Another Example

A plurality of examples are described as described above. This disclosure is not limited to the above described examples and is changeable without departing from the scope of the disclosure. Especially, the plurality of examples and variations described herein may be combined as appropriate.

(1) Variation of Shape of First Gripping Member and Second Gripping Member

Abutment surfaces of a first gripping member and a second gripping member may have a V-shape in a plan view.

(2) Variation of the Movement Operations of First Gripping Member and Second Gripping Member In the first example, the controller moves a pair of gripping members toward a tire at a time. However, the controller may move the pair of gripping members at different times. For example, one gripping member may move to abut against a tire and then the other gripping member moves to abut against the tire to grip the tire.

(3) Variation of Gripping Apparatus

A gripping apparatus may be used for the devices other than a stacker.

The example may be applied to not only article stacking operations but also article unstacking operations. For example, positioning operations may be performed for the unstacking operations in the same way as that for the stacking operations.

(4) Variation of Article

A round-shaped article is not limited to a tire.

INDUSTRIAL APPLICABILITY

The examples are widely applicable to a gripping apparatus to grip a round-shaped article.

The invention claimed is:

1. A gripping apparatus comprising:
a placement section configured to hold a round-shaped article;
a pair of gripping members configured to grip a side of the article placed on the placement section and include an abutment surface having a bent portion and capable of abutting against the side of the article;
a sensor that crosses the bent portion such that an end side and an end side of at least one of the gripping members are connected to each other in a plan view and includes a light axis extending in the direction along the side of the article; and
a controller configured to move the pair of gripping members close to each other to a first position where the article is not gripped but detected with the sensor, receive a detection signal from the sensor, and move the gripping members to a second position where the article is gripped, wherein the abutment surface is circular-arc-shaped in a plan view, and the sensor is arranged such that the light axis intersects at two points of a circular arc.

2. The gripping apparatus according to claim 1, wherein the light axis is orthogonal to a movement direction of the pair of gripping members and links an end portion side to another end portion side of the circular arcs of a first gripping member and a second gripping member in a plan view, respectively.

3. The gripping apparatus according to claim 1, wherein the article is a tire having a side surface on which grooves extending in a horizontal direction are formed and the sensor is arranged such that the light axis is inclined upward against a horizontal direction.

4. The gripping apparatus according to claim 1, wherein, in response to a detection of the article with the sensor, the controller stops movement of a gripping member provided with the sensor out of the pair of gripping members.

5. The gripping apparatus according to claim 1, wherein even if the article is detected with the sensor, the controller continues to move a gripping member provided with the sensor out of the pair of gripping members, and if one of the pair of gripping members moves over the predetermined distance and the article is not detected with the sensor, the controller stops movement of the gripping member and perform an abnormality handling.

6. The gripping apparatus according to claim 1,
wherein, for a first article carried in when there is no article between the pair of gripping members and gripped first, the controller moves the pair of gripping members close to the first position and stop them at the first position, and in response to a detection of the first article with the sensor, the controller moves the pair of gripping members close to each other to a second position where the first article is gripped, and
for a second article gripped secondarily or later, the controller moves the pair of gripping members to the second position without stopping them at the first position to grip the second article, and
after the pair of gripping members stops at the second position for the second article, the controller checks with the sensor that the second article is gripped.

7. A stacker comprising:
the gripping apparatus according to claim 1, and
a driving device that drives the pair of gripping members horizontally and vertically.

8. A gripping apparatus comprising:
a placement section configured to hold a round-shaped article;
a pair of gripping members configured to grip a side of the article placed on the placement section and include an abutment surface having a bent portion and capable of abutting against the side of the article;
a sensor that crosses the bent portion such that an end side and an end side of at least one of the gripping members are connected to each other in a plan view and includes a light axis extending in the direction along the side of the article; and
a controller configured to move the pair of gripping members close to each other to a first position where the article is not gripped but detected with the sensor, receive a detection signal from the sensor, and move the gripping members to a second position where the article is gripped, wherein the article is a tire having a side surface on which grooves extending in a horizontal direction are formed and the sensor is arranged such that the light axis is inclined upward against a horizontal direction.

* * * * *